2,998,298

PROCESS FOR SEPARATING NIOBIUM AND TANTALUM FROM MATERIALS CONTAINING THESE METALS

Walter Scheller, Neuewelt, Switzerland, assignor to Ciba Limited, Basel, Switzerland
No Drawing. Filed July 30, 1956, Ser. No. 600,682
Claims priority, application Switzerland Aug. 4, 1955
12 Claims. (Cl. 23—23)

It is known that the two chemically related metals tantalum and niobium (also known in certain countries as columbium), which are generally found together in nature, are very difficult to separate from one another, and the method used industrially is still based substantially on that of Marignac (1865). Apart from the old method of Marignac which depends on fractional crystallization of alkali double fluorides (whereby the sparingly soluble $K_2TaF_7$ can be separated from a solution containing $K_2NbOF_5$), and has the main disadvantage that it necessitates the use of hydrofluoric acid, there are various other processes which recommend for separating niobium and tantalum a more or less selective chlorination of materials containing niobium and tantalum, if desired, with preliminary reduction or nitride formation, and which all necessitate the use of very high temperatures, sometimes even two high temperature treatments, or are carried out under conditions so difficult to maintain that an effective separation of niobium and tantalum is attended by considerable difficulties only.

The present invention is based on the observation that these two elements can be separated from one another in a relatively simple manner by treating their halides, for example, their chlorides or oxychlorides, and especially a chlorination mixture obtained by chlorinating ores or oxides containing niobium and tantalum in the presence of a reducing agent, in anhydrous alcoholic solution with 8-hydroxyquinoline, after or accompanied by at least partial neutralization of the hydrohalic acid formed during the dissolution, and separating from the solution the sparingly soluble to insoluble products formed.

Mixtures of halides suitable for treatment by the separation process of this invention can be obtained by methods in themselves known, for example, by the chlorination of materials that contain niobium and tantalum in oxidized form, for example, slags and especially concentrates and ores, which may have been after-treated for the purpose of enrichment, or mixtures of oxides of these two metals, with chlorine gas and a reducing agent, such as carbon. Thus, for example, the mixtures of oxides of niobium and tantalum usually available in industry, or natural products which contain the two elements generally in the form of their oxides, may be formed into briquettes with carbon, and the briquettes then treated with chlorine gas at 400° C. to 1000° C. in a shaft or tube furnace. The chlorination products so obtained, which may contain considerable amounts of niobium oxychloride, can be used as starting materials in the present separation process. However, they may first be subjected to further chlorination with chlorine gas in the presence of carbon, whereby the oxychloride is completely converted into pentachloride. The greater part of the chlorides, also formed during the chlorination, of other elements which may be present in the starting material in addition to niobium and tantalum, and compounds of which are usually present as impurities, such, for example, as the chlorides of titanium, tin, manganese, etc., may be at least partially removed in a simple manner, for example, by so adjusting the temperature in the chlorination chamber and in the condensation chamber that the chlorides of the accompanying elements, whose boiling or volatilization points generally differ widely from those of the chlorides of niobium and tantalum, are separated to a great extent from the latter chlorides. Thus, for example, the sparingly volatile chloride of manganese may be separated first, and the more readily volatile chlorides, for example, those of silicon, tin and titanium, are condensed only after the chlorination mixture containing niobium and tantalum to be subjected to separation by the present process, for example, by being precipitated in condensing chambers of lower temperature.

Mixtures of tantalum pentachloride and niobium pentachloride to be used as starting materials in the present process can also be obtained by heating oxides of these metals in a current of dry carbon tetrachloride or by chlorinating alloys of niobium and tantalum. It is especially advantageous to use mixtures which contain only a small amount, for example, 3 to 5 percent of other chlorides. Chlorination mixtures containing only a small amount of other chlorides can be obtained from materials containing niobium and tantalum in a relatively simple manner, for example, by fractional condensation of the chlorination products or by subjecting the chlorination products to fractional distillation. An especially advantageous method of preparing mixtures of halides of tantalum and niobium containing small amounts of other chlorides is first to hydrolyze the chlorination products obtained by chlorinating niobium and tantalum ores, such as columbite, then separate the resulting hydrates or oxyhydrates, for example, by filtration, dry them, and chlorinate them again with chlorine gas in the presence of a reducing agent or with carbon tetrachloride. In this manner there are obtained mixtures of the halides of niobium and tantalum which are especially suitable as starting materials for the present process, since they are practically free from harmful contaminating chlorides, such as iron chloride or harmful quantities of such chlorides.

In the process of the invention the mixtures so obtained, which contains the halides of niobium and tantalum, are dissolved in an anhydrous alcohol, advantageously an anhydrous lower alcohol containing, for example, at most 3 carbon atoms, especially methyl alcohol, or are dissolved in a mixture of alcohols or an organic solvent containing an alcohol, whereby owing to solvolysis an alcoholic hydrochloric acid solution of chloralkoxylates, especially chloromethylates, of niobium and tantalum is formed. When 8-hydroxyquinoline is added to such a solution, no separation occurs owing to the high acidity of the solution. If, however, the hydrohalic acid formed during the dissolution is, for example, progressively neutralized by the addition of an acid-binding agent, first niobium oxyquinolate is precipitated under acid conditions and tantalum oxyquinolate is subsequently precipitated under less acidic conditions. The neutralization may, of course, be carried out before or during the treatment with 8-hydroxyquinoline. Thus, for example, after dissolution of the halides in methanol, the acidity of the resulting acid methanolic solution may be adjusted by the addition of an organic base to a value favorable for the precipitation of niobium oxyquinolate and then an anhydrous solution of 8-hydroxyquinoline added.

The 8-hydroxyquinoline may be added as such or in dissolved form to the anhydrous alcoholic solution of the halides of niobium and tantalum obtained as described above. Whereas for dissolving the halide mixture an alcohol, advantageously one containing at most 3 carbon atoms, such as methanol, is always used, another solvent may be used for dissolving the hydroxyquinoline, provided that the solvent has a good solvent power for amine hydrochlorides and 8-hydroxyquinoline hydrochloride, and of course for 8-hydroxyquinoline itself. Such solvents are mainly organic oxygen-containing liquid compounds such as ethers, esters and especially ketones, preferably acetone. However, it is of advantage to use the same solvent as is used to dissolve the halides. Thus, for example, a methanolic solution of 8-hydroxyquinoline may be added to a methanolic solution of the halides of niobium and tantalum.

The proportion of 8-hydroxyquinoline used may vary within wide limits. There is advantageously used a proportion of 8-hydroxyquinoline which is at least that theoretically required for the formation of complexes with the dissolved metal halides or, if desired, that which is required for the formation of a complex with only one of the dissolved niobium and tantalum compounds. In the presence of an excess of the hydroxyquinoline the solubility of the niobium oxyquinolate is decreased, and the purity of the tantalum in the filtrate is increased. It is, therefore, preferable to use an excess, that is to say, for example, when a concentrated methanolic solution of pentachlorides is used, up to about 100 percent more hydroxyquinoline than is theoretically necessary to convert the whole of the dissolved niobium and tantalum compounds into complexes.

The reaction with 8-hydroxyquinoline is advantageously carried out at a moderately raised temperature or at room temperature. If the free hydrochloric acid liberated when the chlorides are dissolved in the alcohol is not at least partially eliminated before the reaction with 8-hydroxyquinoline, for example, by distillation, by esterification of the alcohol used, by injecting an inert gas such as carbon dioxide or nitrogen, or by neutralization, the said acid must be neutralized with an acid-binding agent after the treatment with 8-hydroxyquinoline or during the precipitation. This may be carried out with weak bases, that is to say, bases having a dissociation constant in water within the range of $10^{-6}$ and $10^{-10}$, but advantageously about $10^{-8}$, for example, within the range of $10^{-7}$ to $10^{-9}$. As such bases there may be mentioned, for example, quinoline, aniline, mono- or diethylaniline, dimethylaniline, 2-methyl-5-ethylpyridine and especially pyridine itself. When such a base is used the hydrochloride of the base formed during neutralization forms a buffer system, which does not become sufficiently basic to precipitate the tantalum oxyquinolate. In these circumstances, therefore, the proportion of the base used is not critical. However, strong bases may be used for the neutralization, that is to say, bases having a dissociation constant in water greater than $10^{-6}$, for example, ammonia gas or a mono-, di- or trialkylamine. When a strong base is used to neutralise the hydrohalic acid, the proportion thereof is so adjusted that at first seven-tenths to nine-tenths of the hydrohalic acid liberated by the solvolysis of the niobium and tantalum pentahalides are neutralized, whereby the niobium oxyquinolate precipitates out and can be separated. In this case an excess of the 8-hydroxyquinoline added can itself partially fulfill the function of a neutralizing base. After separating the niobium oxyquinolate a further quantity of base may be added to complete the neutralization, whereby the tantalum compound is likewise caused to precipitate. The progress of the neutralization itself may be controlled potentiometrically, for example, by the use of a glass electrode and a silver-silver chloride electrode. In other respects the base used is so selected that its hydrochloride and also any co-ordination compound formed between the hydrochloride and the dissolved niobium and tantalum compounds are soluble in the initial alcoholic solution used.

When a strong base is used the neutralization may be carried out in stages in such manner that at first the bulk of the niobium is precipitated as oxyquinolate and, after the addition of further quantities of the base, an intermediate fraction consisting of the oxyquinolates of niobium and tantalum is obtained. This fraction is then removed from the solution which is then further neutralized to yield a pure tantalum fraction. Moreover, the alcoholic solution of the chlorides may be neutralized, as stated above, before adding the hydroxyquinoline in the desired amount.

All the operations, i.e. including the precipitation itself, are advantageously carried out in a moisture-free atmosphere such as is produced, for example, by scavenging with a dry inert gas(nitrogen or carbon dioxide). The precipitation is advantageously carried out at a slightly raised temperature (40° C. to 60° C.), and the precipitation conditions are so chosen, for example, by the slow addition of the base, that the precipitate forms slowly and in a coarsely granular form. After the neutralization it is desirable to stir the mixture for a considerable time in order that the precipitate may crystallize out completely.

The sparingly soluble to insoluble complex compounds of niobium or tantalum can be separated from the solution, for example, by centrifuging or filtering. Thus, it is possible to separate from a mixture of the chlorides of niobium and tantalum the niobium oxyquinolate, that precipitates under the more acid conditions resulting from partial neutralization of the acid formed during the dissolution of hte chlorides in alcohol, from the tantalum complex that precipitates only under more alkaline conditions.

It will be understood that the 8-hydroxyquinoline used as precipitant can be regenerated after the treatment in a manner in itself known and that it can be so regenerated both from the precipitate and the filtrate and reused in the process. Similarly, the solvent recovered, for example, by concentrating the filtrate, can easily be reused in the process for the production of further quantities of the solution of the halides of niobium and tantalum serving as the initial mixture. Thus, niobium may be separaed from tantalum in a cyclic process, in which it is necessary only to make good the quantity of halides of niobium and tantalum consumed and, if desired, any losses of precipitant and solvent.

The simple process of this invention for separating niobium and tantalum from one another in an anhydrous medium is specially surprising, because a similar separation of these metals by forming complexes from aqueous solution is impossible or very difficult to carry out.

The following examples illustrate the invention, the parts and percentages being by weight. The purity of the niobium and tantalum oxides obtained was determined, unless otherwise stated, by spectrography, on the one hand, in an electric arc and also in sparks produced by the Feussner apparatus, the accuracy being about 1 percent calculated on the principle constituent.

EXAMPLE 1

6.1 grams of $NbCl_5$ and 4.87 grams of $TaCl_5$ were dissolved in 30 cc. of anhydrous methanol. The solution was slowly added, while stirring, to a solution of 20 grams of 8-hydroxyquinoline in 70 cc. of methanol at 40–60° C. By the slow addition of 20 cc. of pyridine the acid formed by solvolysis was bound. While continually stirring for 3–24 hours the mixture was allowed to cool to 0°–20° C., and the yellow crystalline niobium oxyquinolate was filtered off. The precipitate was thoroughly washed with a methanolic solution of hydroxyquinoline and pyridine.

After recovering the hydroxyquinoline (see below), there was obtained a product of which about 99.2–99.8 percent consisted of niobium compounds (calculated as $Nb_2O_5$).

The filtrate containing tantalum and the washing liquor were separately evaporated to recover the greater part of the methanol and pyridine. The residue was heated in sulfuric acid of 5–50 percent strength until complete hydrolytic splitting has occurred. The precipitated oxide-hydrates were filtered off and calcined. Thus treated, the filtrate containing tantalum gave a product of which about 99.5 percent consisted of tantalum compounds (calculated as $Ta_2O_5$, and the small amount of oxide recovered from the washing liquor was about 90–98 percent of tantalum compounds.

Thus, it is possible in this manner to split up a mixture of the chlorides of niobium and tantalum, which contains approximately the same amount of niobium as of tantalum, into two fractions one of which contains practically the whole of the niobium and the other of which contains all the tantalum.

The tantalum can also be isolated in the form of its oxyquinolate from the filtrate containing tantalum, for example, by introducing ammonia gas, whereby the hydroxyquinoline-tantalum complex precipitates after a short time, i.e., after neutralization of the mineral acid, and can be filtered off.

Recovery of the hydroxyquinoline

In order to recover the hydroxyquinoline the filtrate, which is practically free from niobium and tantalum, is neutralized with ammonia. The precipitated 8-hydroxyquinoline is filtered off, washed and dried. Instead of ammonia there may be used sodium hydroxide or potassium hydroxide or an alkali metal salt of a weak acid, such as sodium carbonate.

The hydroxyquinoline can be recovered from the niobium precipitate containing hydroxyquinoline in the following manner: After decomposing the oxyquinolate of niobium with sulfuric acid of 50 percent strength at the boiling temperature, the mixture is diluted with water until a sulfuric acid solution of about 5 percent strength is produced, and the mixture is heated for a few hours. The niobium oxide-hydrate formed is filtered off. The filtrate is neutralized and the precipitated 8-hydroxyquinoline is filtered off.

EXAMPLE 2

24.3 grams of niobium pentachloride and 19.67 grams of tantalum pentachloride were dissolved in 100 cc. of absolute methanol and the solution was filtered (solution 1).

66 grams of hydroxyquinoline were dissolved at about 50–60° C. in 150 cc. of absolute methanol and the solution was filtered while warm (solution 2).

Solution 1 was slowly added to solution 2 having a temperature of about 40–50° C., while stirring vigorously, during which the temperature rose to 60–70° C. After about 5 minutes neutralization was brought about by the slow addition of 80 cc. of pyridine, and the mixture was further agitated for 6 hours and allowed to stand overnight. The next day the mixture was stirred for a further 30 minutes and then the niobium oxyquinolate was filtered off.

The precipitate was thoroughly washed twice in a solution of 20 grams of hydroxyquinoline and 20 cc. of pyridine in 130 cc. of methanol. The precipitate so obtained and the filtrate containing tantalum were worked up in the manner described in paragraphs 1 to 3 of Example 1.

Results 96 percent of the niobium present and 97 percent of the tantalum were separately obtained each having a purity of 99.5 percent (calculated as $Nb_2O_5$ and $Ta_2O_5$, respectively).

From the combined washing liquors there was obtained a mixture of oxides, consisting of 97.5 percent of $Ta_2O_5$ and 2.5 percent of $Nb_2O_5$. The total yield of oxides amounted to 98.3 percent of the starting material. The hydroxyquinoline was recovered to the extent of 97.5 percent.

By using ethyl alcohol or isopropyl alcohol, instead of methanol, the tantalum was obtained in a somewhat less pure state, as the oxyquinolates (especially niobium oxyquinolate) are substantially more soluble in these alcohols than in methanol, and cannot therefore be completely separated from one another.

EXAMPLE 3

17.42 grams of $NbCl_5$ and 15.45 grams of $TaCl_5$ were dissolved in 100 cc. of absolute methanol and 80 cc. of pyridine were added to the solution, and the whole was filtered (solution 1).

60 grams of hydroxyquinoline were dissolved in 150 cc. of dry acetone and the solution was filtered (solution 2).

Solution 1 having a temperature of 50–50° C. was slowly added, while stirring vigorously, to the warm solution 2, and the mixture, after being stirred for 4 hours, was allowed to stand overnight. On the day after the mixture was stirred for a further 30 minutes and then the precipitate was filtered off.

The filtered niobium oxyquinolate was thoroughly washed with acetone, then hydrolyzed with sulfuric acid, and the niobium oxide-hydrate formed was separated from the sulfuric acid solution containing hydroxyquinoline.

By introducing ammonia gas into the filtrate containing tantalum, tantalum oxyquinolate was precipitated. The tantalum oxyquinolate was thoroughly washed with acetone, then hydrolyzed with sulfuric acid, and the tantalum oxide-hydrate formed, after being separated from the solution containing hydroxyquinoline, was calcined and subjected to spectrographic analysis.

EXAMPLE 4

A crude mixture of chlorides (about 350 grams) obtained by chlorinating a mixture of columbite and carbon with chlorine gas at 700° C. was dissolved in about 500 cc. of methanol, during which substantial quantities of chlorine escaped in the form of hydrochloric acid and could be recovered. After expelling further quantities of hydrogen chloride by boiling the mixture under reflux while blowing in a dry current of nitrogen, the alcoholic solution was mixed with 100 cc. of concentrated hydrochloric acid, and heated. It was then slowly diluted with water and finally sulfuric acid of 50 percent strength was added at a raised temperature whereby the oxide-hydrates of niobium and tantalum were precipitated.

The precipitated oxide-hydrates were filtered off and heated at the boil with a mixture of dilute hydrochloric acid and sulfuric acid. The residue obtained by filtration was calcined and again chlorinated at 700° C. by means of chlorine gas in the presence of carbon.

20 grams of the chloride mixture so obtained, which contained in addition to niobium pentachloride and tantalum pentachloride, oxychlorides and especially niobium oxychloride, were dissolved in 100 cc. of methanol and filtered (solution 1). 40 grams of hydroxyquinoline were dissolved in 150 cc. of methanol (solution 2). Solution 1 was added, while stirring to solution 2. The potential difference in the resulting solution was measured between a glass electrode and a silver-silver chloride electrode and amounted to 290 millivolts. To the solution, which has been heated to about 50° C., 85 cc. of pyridine were slowly added, while stirring vigorously, and the solution was kept in motion for 5 hours. In this manner the potential difference fell to 180 millivolts. The precipitated niobium oxyquinolate was filtered off with the exclusion of moisture and thoroughly washed with methanol.

The tantalum oxyquinolate was precipitated from the filtrate by neutralization with triethylamine, and filtered off and thoroughly washed with methanol.

The two fractions were worked up by acid hydrolysis in the manner described above. The purities of the oxides so obtained were as follows:

$Nb_2O_5 = 98.5 \pm 1\%$
$Ta_2O_5 = 97 \pm 2\%$

What is claimed is:

1. In the separation of niobium and tantalum values from a mixture of chlorides of these metals, the improvement which comprises dissolving a mixture of anhydrous chlorides of niobium and of tantalum in anhydrous methyl alcohol, mixing the resulting solution with an anhydrous methanolic solution of 8-hydroxyquinoline, precipitating sparingly soluble niobium values by progressively adding a nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine, thereby neutralizing the hydrochloric acid formed during the dissolution of the chlorides, discontinuing the addition of said base prior to complete neutralization of the acid but after neutralization of the greater part thereof, separating the precipitated niobium values and recovering the tantalum values from the solution substantially freed from niobium.

2. In the separation of niobium and tantalum values from a mixture of chlorides of these metals, the improvement which comprises dissolving a mixture of anhydrous chlorides of niobium and of tantalum in anhydrous methyl alcohol, mixing the resulting solution with a solution of 8-hydroxy quinoline in anhydrous acetone, progressively neutralizing the hydrochloric acid formed during the dissolution of the chlorides by means of a nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine, discontinuing the neutralization prior to complete neutralization of said acid but after neutralization of the greater part thereof, separating the precipitated niobium values and recovering the tantalum values from the solution substantially freed from niobium.

3. In the separation of niobium and tantalum values from a mixture of chlorides of these metals, the improvement which comprises dissolving a mixture of anhydrous chlorides of niobium and of tantalum in anhydrous methyl alcohol, mixing the resulting solution with an anhydrous methanolic solution of 8-hydroxyquinoline, while neutralizing, by means of a nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine, seven- to nine-tenths of the acid formed during the dissolution of the chlorides, separating the insoluble niobium values from the solution, and recovering the tantalum values from the solution substantially freed from niobium.

4. In the separation of niobium and tantalum values from a mixture of chlorides of these metals, the improvement which comprises dissolving in anhydrous methyl alcohol a mixture consisting substantially of anhydrous niobium- and tantalum-pentachlorides, mixing the resulting solution with a methanolic anhydrous solution of 8-hydroxyquinoline, neutralizing the hydrochloric acid formed during the dissolution of the pentachlorides by means of a weak organic nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine, discontinuing the neutralization prior to complete neutralization of said acid but after neutralization of the greater part thereof, separating the precipitated niobium values from the solution and recovering tantalum values from the solution substantially freed from niobium.

5. In the separation of niobium and tantalum values from a mixture of chlorides of these metals, the improvement which comprises dissolving in anhydrous methyl alcohol a mixture consisting essentially of anhydrous-niobium- and tantalum-pentachlorides, mixing the resulting solution with a methanolic anhydrous solution of 8-hydroxyquinoline, neutralizing the hydrochloric acid formed during the dissolution of the pentachlorides by means of a weak organic nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine, discontinuing the neutralization prior to complete neutralization of said acid but after neutralization of the greater part thereof, separating the thus-precipitated niobium values from the solution, neutralizing the remaining acid in the solution by means of a stronger base and separating the thus-precipitated tantalum values from the solution.

6. In the separation of niobium and tantalum values from a mixture of chlorides of these metals, the improvement which comprises dissolving a mixture of pentachlorides and oxychlorides of niobium and tantalum in anhydrous methanol containing 8 - hydroxyquinoline, whereby hydrochloric acid is formed, neutralizing the said acid by the addition of pyridine, discontinuing the said addition prior to complete neutralization of the acid but after neutralization of the greater part thereof, whereby niobium values are selectively precipitated, filtering off the precipitated niobium values, and evaporating the methanolic solution, thus recovering tantalum values substantially free from niobium.

7. In the separation of niobium and tantalum values from a mixture of chlorides of these metals, the improvement which comprises dissolving the mixture to be separated in an anhydrous alcohol having up to 3 carbon atoms with formation of hydrochloric acid, adding to the resulting solution nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine to effect neutralization of said acid but discontinuing addition of base prior to complete neutralization of said acid and after neutralization of the greater part thereof, adding 8-hydroxyquinoline to the alcoholic solution in an amount at least equal to that theoretically required for the formation of the metal chloride complex, whereby niobium values are precipitated, and recovering the precipitated values.

8. In the separation of niobium and tantalum values from a mixture of chlorides of these metals, the improvement which comprises dissolving said mixture of chlorides of these metals in an anhydrous alcohol, having up to 3 carbon atoms, with formation of hydrochloric acid, adding to the resulting solution a nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine, and trialkylamine to effect neutralization of said acid, but discontinuing addition of the base prior to complete neutralization of said acid and after neutralization of the greater part thereof, adding 8-hydroxyquinoline to the alcoholic solution, whereby niobium values are precipitated, and recovering the precipitated values.

9. In the separation of niobium and tantalum values from a mixture of chlorides of these metals, the improvement which comprises dissolving said mixture of chlorides of these metals in an anhydrous alcohol, having up to 3 carbon atoms, with formation of hydrochloric acid, adding 8-hydroxyquinoline to the resulting alcoholic solution, adding to said solution nitrogen-containing base selected from the group consisting of quinoline, aniline, monoethylaniline, diethylaniline, dimethylaniline, 2-methyl-5-ethylpyridine, pyridine, ammonia gas, monoalkylamine, dialkylamine and trialkylamine to effect neutralization of said acid, but discontinuing said addition of base prior to complete neutralization of said acid and after neutralization of the greater part thereof, whereby niobium values are precipitated, and recovering the precipitated values.

10. In the separation of niobium and tantalum values from a mixture of chlorides of these metals, the improvement which comprises dissolving a mixture of anhydrous chlorides of niobium and of tantalum in anhydrous methyl alcohol, mixing the resulting solution with an anhydrous methanolic solution of 8-hydroxyquinoline, precipitating sparingly soluble niobium values by progressively adding pyridine, thereby neutralizing the hydrochloric acid formed during the dissolution of the chlorides, discontinuing the addition of pyridine prior to complete neutralization of the acid but after neutralization of the greater part thereof, separating the precipitated niobium values recovering the tantalum values from the solution substantially freed from niobium.

11. In the separation of niobium and tantalum values from a mixture of chlorides of these metals, the improvement which comprises dissolving a mixture of anhydrous chlorides of niobium and of tantalum in anhydrous methyl alcohol, mixing the resulting solution with a solution of 8-hydroxyquinoline in anhydrous acetone, progressively neutralizing by means of pyridine the hydrochloric acid formed during the dissolution of the chlorides, discontinuing the neutralization prior to complete neutralization of said acid but after neutralization of the greater part thereof, separating the precipitated niobium values and recovering the tantalum values from the solution substantially freed from niobium.

12. In the separation of niobium and tantalum values from a mixture of chlorides of these metals, the improvement which comprises disolving a mixture of anhydrous chlorides of niobium and of tantalum in anhydrous alcohol, mixing the resulting solution with an anhydrous methanolic solution of 8-hydroxyquinoline, while neutralizing by means of pyridine seven- to nine-tenths of the acid formed during the dissolution of the chlorides, separating the insoluble niobium values from the solution, and recovering the tantalum values from the solution substantially freed from niobium.

References Cited in the file of this patent

Thilo et al.: Berichte, vol. 72 (1939), pp. 1048–52.

Hollingshead: Oxine and its Derivatives, vol. I (1954), p. 1.

Hollingshead: Oxine and its Derivatives, vol. II (1954), pp. 554–5.